(12) United States Patent
Huh (10) Patent No.: US 11,370,409 B2
(45) Date of Patent: Jun. 28, 2022

(54) METHOD AND SYSTEM FOR CONTROLLING ENGINE ON OF HYBRID VEHICLE

(71) Applicants: Hyundai Motor Company, Seoul (KR); Kia Motors Corporation, Seoul (KR)

(72) Inventor: Jee Wook Huh, Gwangmyeong-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 231 days.

(21) Appl. No.: 16/684,467

(22) Filed: Nov. 14, 2019

(65) Prior Publication Data

US 2021/0003211 A1 Jan. 7, 2021

(30) Foreign Application Priority Data

Jul. 3, 2019 (KR) ........................ 10-2019-0079900

(51) Int. Cl.
| | |
|---|---|
| *B60W 20/30* | (2016.01) |
| *B60W 20/10* | (2016.01) |
| *B60W 30/19* | (2012.01) |
| *F16H 61/02* | (2006.01) |
| *B60W 50/06* | (2006.01) |
| *F16H 61/00* | (2006.01) |
| *B60W 20/40* | (2016.01) |

(52) U.S. Cl.
CPC ............ *B60W 20/10* (2013.01); *B60W 20/30* (2013.01); *B60W 30/19* (2013.01); *B60W 20/40* (2013.01); *B60W 2050/065* (2013.01); *F16H 61/0204* (2013.01); *F16H 2061/0087* (2013.01)

(58) Field of Classification Search
CPC ...... B60W 20/10; B60W 10/10; B60W 20/40; B60W 20/30; B60W 30/19; B60W 2050/146; B60W 50/14; B60W 10/06; B60W 10/11; B60W 2540/10; B60W 2540/106; B60W 2520/10; B60W 2520/105
USPC ........................................... 701/54
See application file for complete search history.

(56) References Cited

U.S. PATENT DOCUMENTS

| | | | | |
|---|---|---|---|---|
| 2007/0056783 | A1* | 3/2007 | Joe .......................... | B60L 58/12 180/65.265 |
| 2016/0207520 | A1* | 7/2016 | Mizushima ........... | B60W 50/14 |
| 2018/0354497 | A1* | 12/2018 | Lee ........................ | B60W 20/40 |
| 2019/0193750 | A1* | 6/2019 | Kim ....................... | B60W 10/10 |
| 2020/0256460 | A1* | 8/2020 | Naito ..................... | B60K 6/387 |

FOREIGN PATENT DOCUMENTS

| | | | | |
|---|---|---|---|---|
| EP | 0947741 | A2 * | 10/1999 | |
| EP | 2168826 | B1 * | 5/2017 | ............. B60K 35/00 |
| KR | 10-1481335 | B1 | 1/2015 | |

* cited by examiner

*Primary Examiner* — Roger L Pang
(74) *Attorney, Agent, or Firm* — Morgan, Lewis & Bockius LLP (57) ABSTRACT

A method of controlling engine on of a hybrid vehicle, may include determining, by a controller, a shift pattern of the vehicle between multiple regions; deriving, by the controller, a shifting possibility of the vehicle from each of the regions; and deriving an engine-on strategy of the vehicle on the basis of the derived shifting possibility, and controlling an engine of the vehicle to be on or off in accordance with the derived engine-on strategy.

18 Claims, 7 Drawing Sheets

METHOD AND SYSTEM FOR CONTROLLING ENGINE ON OF HYBRID VEHICLE

CROSS REFERENCE TO RELATED APPLICATION

The present application claims priority to Korean Patent Application No. 10-2019-0079900, filed Jul. 3, 2019, the entire contents of which is incorporated herein for all purposes by this reference.

BACKGROUND OF THE INVENTION

Field of the Invention

The present invention relates to a method and system for controlling engine on of a hybrid vehicle. More particularly, the present invention relates to a method and system for controlling engine on of a hybrid vehicle, whereby engine on is controlled on the basis of a shifting possibility of the vehicle.

Description of Related Art

In the case of hybrid or plug-in hybrid vehicles, an engine-on strategy is a key to improving the fuel efficiency of hybrid or plug-in hybrid vehicles because the overall fuel efficiency depends largely on the engine-on strategy.

In general, when the driving load of a vehicle is high, the efficiency of an engine increases and thus a strategy of turning on the engine is used. On the other hand, when the driving load of the vehicle is low, the efficiency of the engine is poor and thus a strategy of driving the vehicle in an electric vehicle (EV) mode is used. Furthermore, when the driving load of the vehicle is low and engine on is required for reasons such as SOC decrease, the vehicle is driven at a driving point with good engine efficiency and a motor is charged to increase the efficiency. However, the present approach may lead to a decrease in the efficiency due to charging and discharging of the motor, and the engine-on strategy is therefore essential.

Meanwhile, to minimize deterioration of the overall fuel efficiency of the vehicle, it is important to perform control to not allow engine on to be performed properly in a situation where the frequency of gear shifting is high. However, generally, it takes a lot of time to perform mapping to not allow engine on to be performed properly in a situation where the frequency of gear shifting is high. In addition to the present problem, when the driver's characteristics or the shift pattern is changed, new mapping is required, thus leading to an increase in the time required therefor.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method and system for controlling engine on of a hybrid vehicle, whereby an engine-on strategy of the vehicle is derived in consideration of a shifting possibility of the vehicle, and engine on is performed on the basis of the derived strategy, thus ensuring that the overall fuel efficiency of the vehicle is improved.

In various aspects of the present invention, there is provided a method of controlling engine on of a hybrid vehicle, the method including: determining, by a controller, a shift pattern of the vehicle between multiple regions; deriving, by the controller, a shifting possibility of the vehicle from each of the regions; and deriving an engine-on strategy of the vehicle on the basis of the derived shifting possibility, and controlling an engine of the vehicle to be on or off in accordance with the derived engine-on strategy.

In the determining the shift pattern of the vehicle between the multiple regions, it may be determined which region the shift pattern is on the basis of at least one of an accelerator pedal stroke, a variation of the accelerator pedal stroke, a vehicle speed, and a variation of the vehicle speed.

In the determining the shift pattern of the vehicle between the multiple regions, the regions may include a first region, a second region, and a third region.

In the determining the shift pattern of the vehicle between the multiple regions, when the variation of the accelerator pedal stroke is greater than a predetermined first variation and the vehicle speed is less than a predetermined value, the shift pattern of the vehicle may be determined to be the first region, when the variation of the accelerator pedal stroke is less than a predetermined second variation and the variation of the vehicle speed is greater than a predetermined first vehicle speed variation, the shift pattern of the vehicle may be determined to be the second region, and when the variation of the accelerator pedal stroke is less than a predetermined third variation and an absolute value of the variation of the vehicle speed is less than a predetermined second vehicle speed variation, the shift pattern of the vehicle may be determined to be the third region.

The deriving the shifting possibility of the vehicle from each of the regions may include: determining whether the shifting possibility of the vehicle in the first region is a first possibility, a second possibility, or a third possibility; determining whether the shifting possibility of the vehicle in the second region is the first possibility, the second possibility, or the third possibility; and determining whether the shifting possibility of the vehicle in the third region is the first possibility, the second possibility, or the third possibility, wherein a scale of each of the first to third possibilities may be predetermined.

The determining whether the shifting possibility of the vehicle is the first possibility, the second possibility, or the third possibility in the first region in which the variation of the accelerator pedal stroke is greater than a first predetermined variation and the vehicle speed is less than a predetermined value may include: determining a time to reach a shift start point of the vehicle on the basis of a variation of a current accelerator pedal stroke and the determined shift pattern; and comparing the determined time with a predetermined first time and a predetermined second time, and determining that the shifting possibility is the first possibility when the determined time is less than the first time, that the shifting possibility is the second possibility when the determined time is greater than the first time and less than the second time, and that the shifting possibility is the third possibility when the determined time is greater than the second time.

The determining whether the shifting possibility of the vehicle is the first possibility, the second possibility, or the third possibility in the second region in which the variation of the accelerator pedal stroke is less than a predetermined second variation and the vehicle speed is greater than a predetermined first vehicle speed variation may include: determining a time to reach a shift start point of the vehicle on the basis of a current accelerator pedal stroke and the determined shift pattern; and comparing the determined time with a predetermined third time and a predetermined fourth time, and determining that the shifting possibility is the first possibility when the determined time is less than the third time, that the shifting possibility is the second possibility when the determined time is greater than the third time and less than the fourth time, and that the shifting possibility is the third possibility when the determined time is greater than the fourth time.

The determining whether the shifting possibility of the vehicle is the first possibility, the second possibility, or the third possibility in the third region in which the variation of the accelerator pedal stroke is less than a predetermined third variation and an absolute value of the vehicle speed is less than a predetermined second vehicle speed variation may include: determining a time to reach a shift start point of the vehicle on the basis of a variation of a current accelerator pedal stroke and the determined shift pattern; and comparing the determined time with a predetermined fifth time and a predetermined sixth time, and determining that the shifting possibility is the first possibility when the determined time is less than the fifth time, that the shifting possibility is the second possibility when the determined time is greater than the fifth time and less than the sixth time, and that the shifting possibility is the third possibility when the determined time is greater than the sixth time.

In the deriving the engine-on strategy of the vehicle on the basis of the derived shifting possibility, and controlling the engine of the vehicle to be on or off in accordance with the derived engine-on strategy, when the shifting possibility of the vehicle is determined to be the third possibility, the engine of the vehicle may be on when a driver's required torque is greater than a predetermined first torque and a time at which the driver's required torque is greater than the first torque is maintained for a first constant time, and the engine may be off when the driver's required torque is equal to or less than a predetermined second torque.

In the deriving the engine-on strategy of the vehicle on the basis of the derived shifting possibility, and controlling the engine of the vehicle to be on or off in accordance with the derived engine-on strategy, when the shifting possibility of the vehicle is determined to be the second possibility, the engine of the vehicle may be immediately on when the driver's required torque is equal to or greater than a predetermined third torque, and the engine may be off when the driver's required torque is equal to or less than a predetermined fourth torque.

In the deriving the engine-on strategy of the vehicle on the basis of the derived shifting possibility, and controlling the engine of the vehicle to be on or off in accordance with the derived engine-on strategy, when the shifting possibility of the vehicle is determined to be the first possibility, the engine of the vehicle may be on when the driver's required torque is greater than a predetermined fifth torque and a time at which the driver's required torque is greater than the fifth torque is maintained for a second constant time, and the engine may be off when the driver's required torque is equal to or less than a predetermined sixth torque.

The second constant time may be longer than the first constant time.

In the first torque, the second torque, the third torque, the fourth torque, the fifth torque, and the sixth torque, a magnitude of each of the torques may be predetermined.

The method may further include after the deriving the engine-on strategy of the vehicle on the basis of the derived shifting possibility, and controlling the engine of the vehicle to be on or off in accordance with the derived engine-on strategy, displaying that the on or off of the engine is controlled in accordance with the derived engine-on strategy.

In the displaying that the on or off of the engine is controlled in accordance with the derived engine-on strategy, it may be displayed whether the engine of the vehicle is on previously, or the on of the engine is retarded in accordance with the derived shifting possibility.

According to various aspects of the present invention, there is a system for controlling engine on of a hybrid vehicle, the system including: a transmission control unit including a storage unit storing information related to a shift pattern of the vehicle which is determined between multiple regions, and deriving, by the controller, a shifting possibility of the vehicle from each of the regions stored in the storage unit; and a hybrid control unit deriving an engine-on strategy of the vehicle on the basis of the shifting possibility derived by the transmission control unit, and controlling an engine of the vehicle to be on or off in accordance with the derived engine-on strategy.

The system may further include a data collection unit connected to the TCU and collecting at least one piece of data among an accelerator pedal stroke, a variation of the accelerator pedal stroke, a vehicle speed, and a variation of the vehicle speed.

The system may further include a display unit displaying that the on or off of the engine of the vehicle is performed on the basis of the shifting possibility under cooperative control of the transmission control unit and the hybrid control unit.

According to an exemplary embodiment of the present invention, there is an advantage in that the engine-on strategy of the vehicle is derived in consideration of the shifting possibility of the vehicle and, on or off of the engine is performed on the basis of the derived strategy, thus realizing improved overall fuel efficiency.

Furthermore, there is an advantage in that a driving deterioration factor which may occur when engine clutch engagement and gear shifting occur simultaneously is improved, thus improving the marketability.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings such that the present invention may be easily embodied by one of ordinary skill in the art to which the present invention belongs. However, the present invention is not limited to the exemplary embodiments described herein and may be achieved in other ways.

Figure 1:
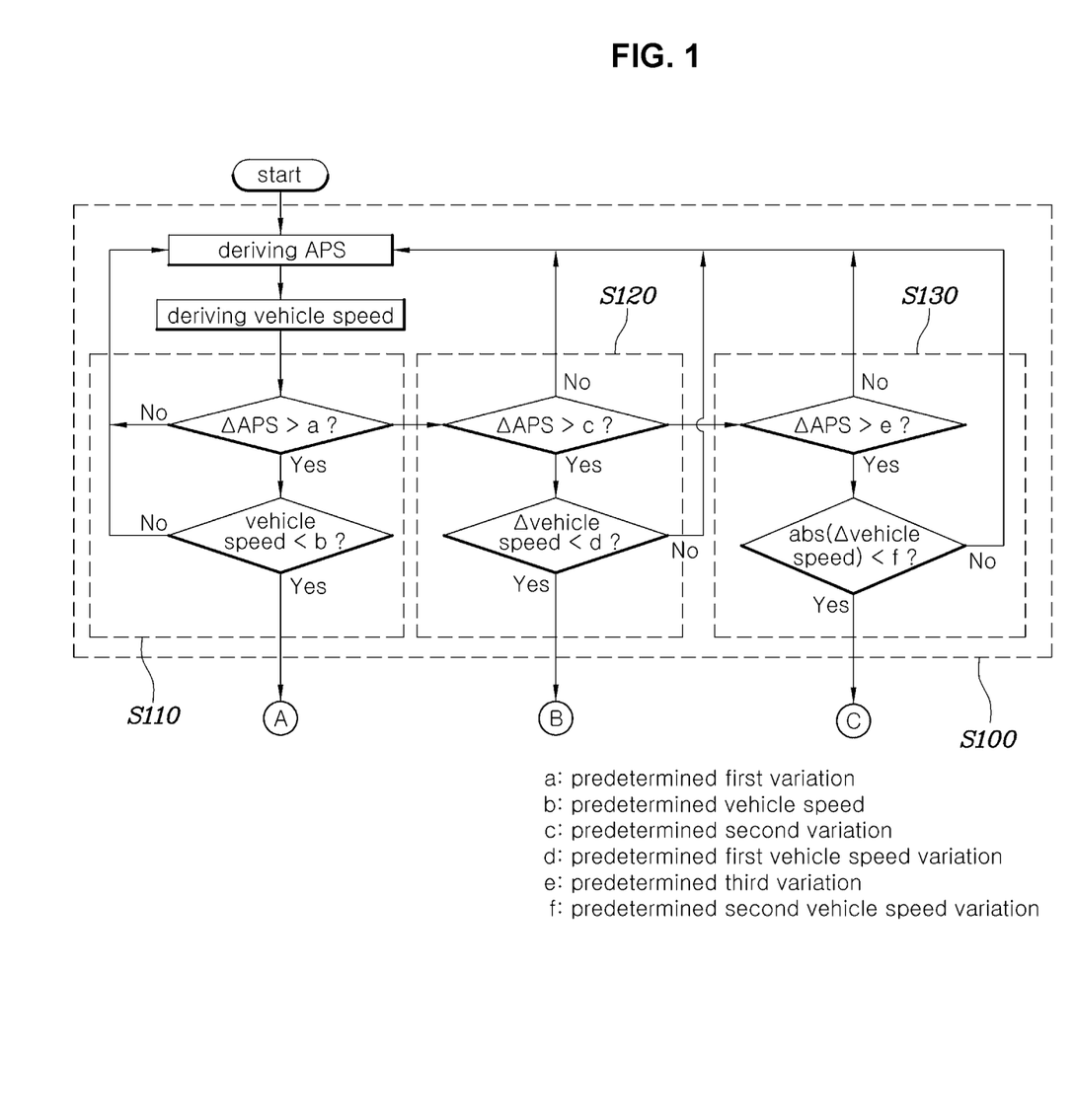
FIG. 1 and FIG. 2 are flowcharts showing a method of controlling engine on of a hybrid vehicle according to an exemplary embodiment of the present invention.
Figure 2:
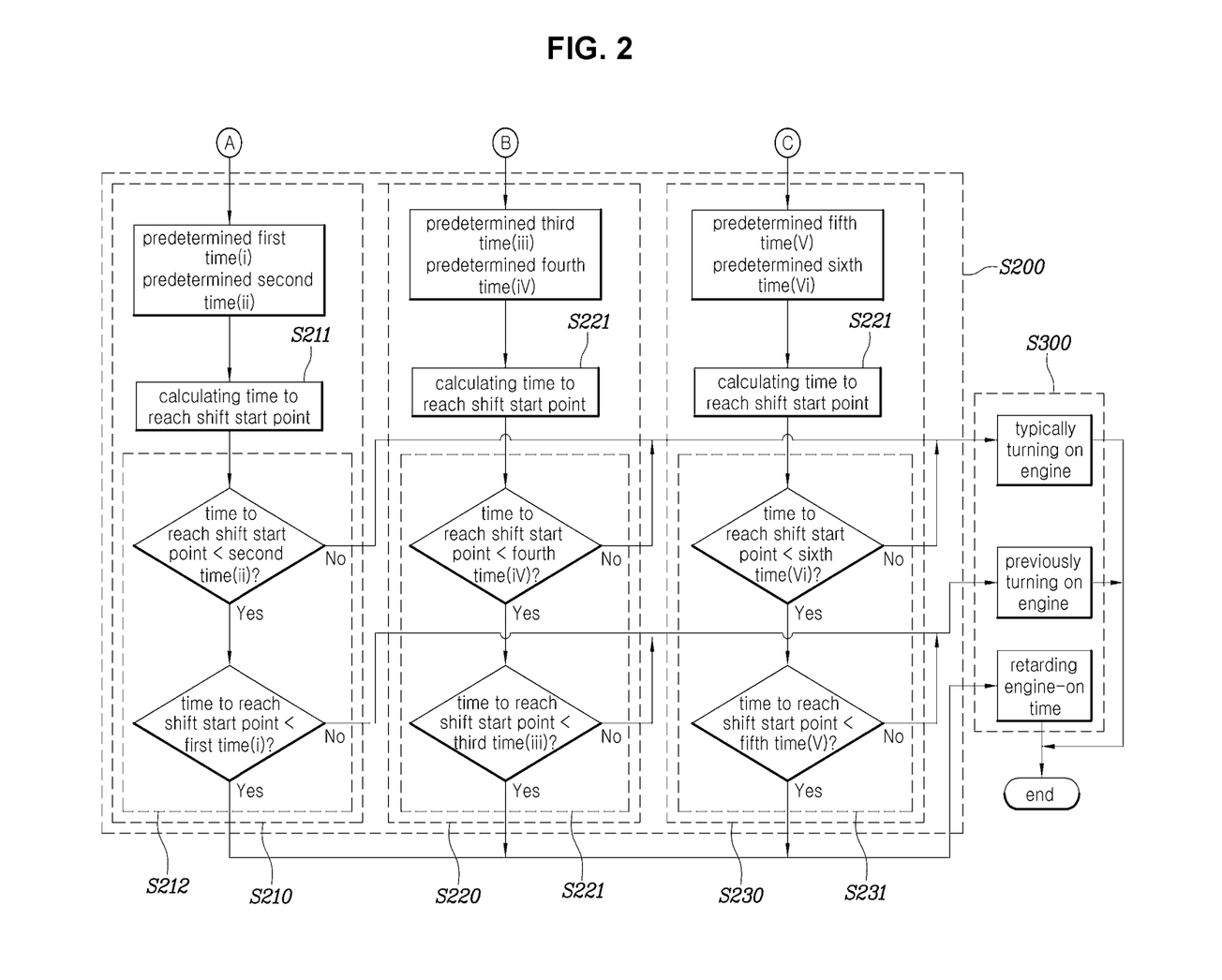
Figure 3:
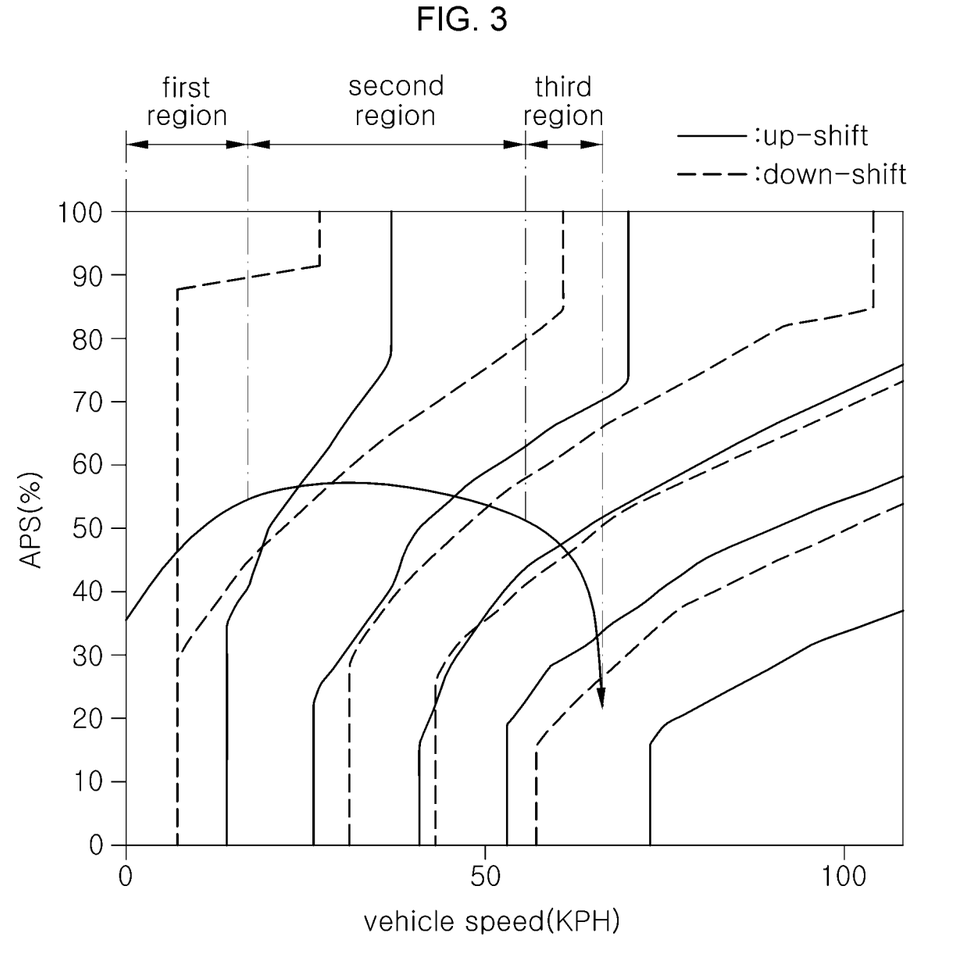
FIG. 3 is view showing the method of controlling the engine on of the hybrid vehicle according to the exemplary embodiment of the present invention, in which a shift pattern of the vehicle is determined between multiple regions.
Figure 4:
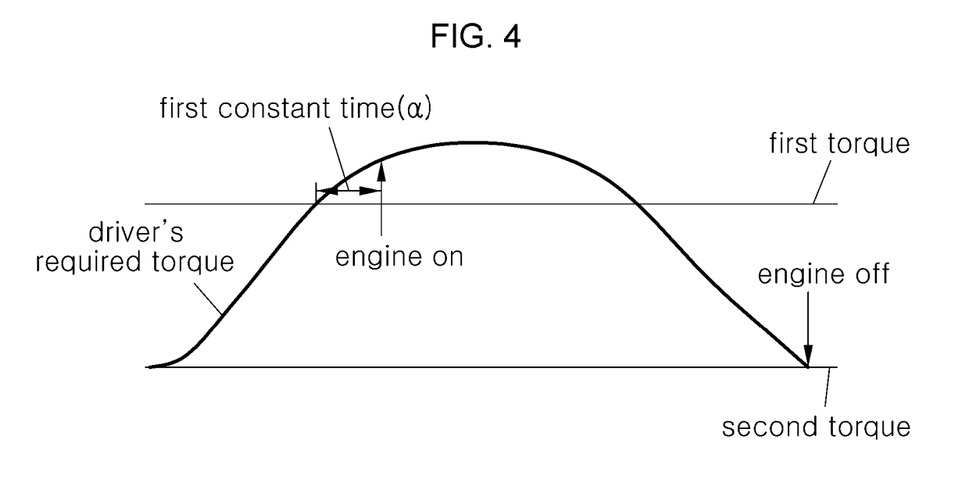
FIG. 4 is a view showing the method of controlling the engine on of the hybrid vehicle according to the exemplary embodiment of the present invention, in which engine on/off is controlled when a shifting possibility of the vehicle is defined as a third possibility.
Figure 5:
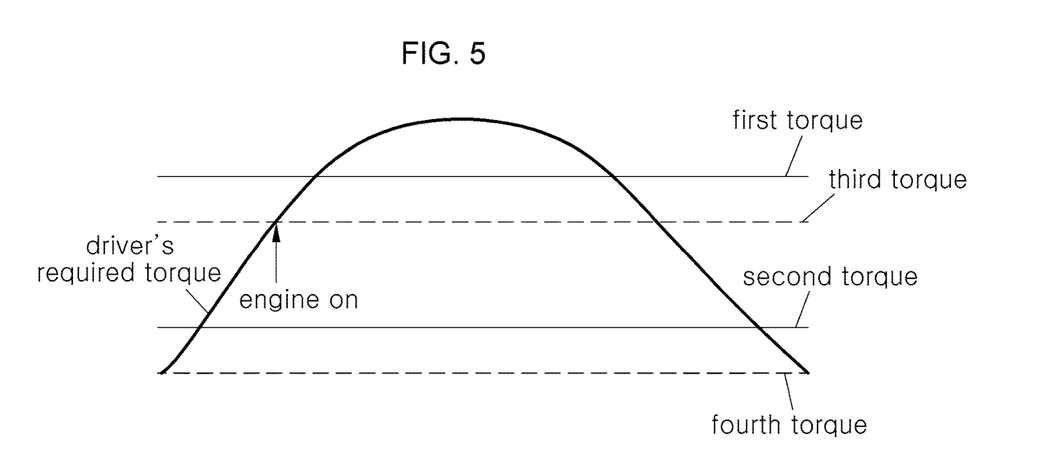
FIG. 5 is a view showing the method of controlling the engine on of the hybrid vehicle according to the exemplary embodiment of the present invention, in which engine on/off is controlled when the shifting possibility of the vehicle is defined as a second possibility.
Figure 6:
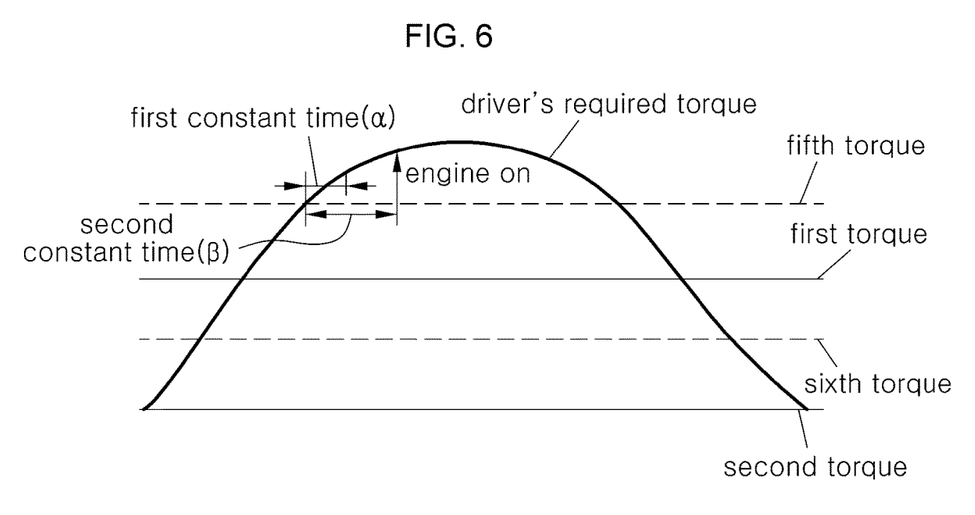
FIG. 6 is a view showing the method of controlling the engine on of the hybrid vehicle according to the exemplary embodiment of the present invention, in which engine on/off is controlled when the shifting possibility of the vehicle is defined as a first possibility.
Figure 7:
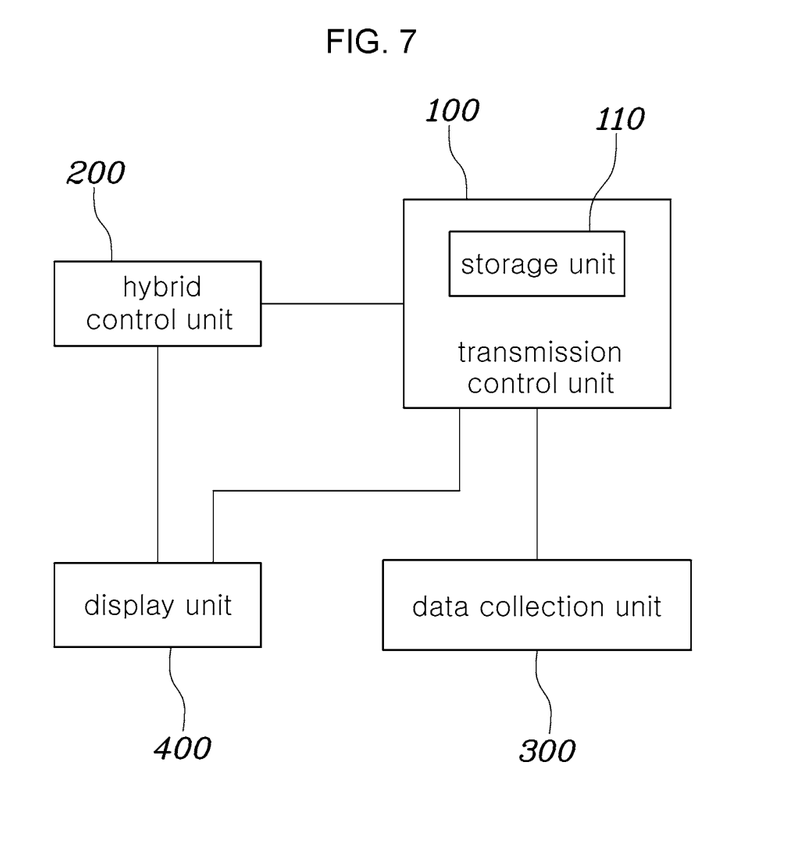
FIG. 7 is a view showing a configuration of a system for controlling engine on of a hybrid vehicle according to an exemplary embodiment of the present invention.

FIG. 1 and FIG. 2 are flowcharts showing a method of controlling engine on of a hybrid vehicle according to an exemplary embodiment of the present invention, FIG. 3 is view showing the method of controlling the engine on of the hybrid vehicle according to the exemplary embodiment of the present invention, in which a shift pattern of the vehicle is determined between multiple regions, FIG. 4 is a view showing the method of controlling the engine on of the hybrid vehicle according to the exemplary embodiment of the present invention, in which engine on/off is controlled when a shifting possibility of the vehicle is defined as a third possibility, FIG. 5 is a view showing the method of controlling the engine on of the hybrid vehicle according to the exemplary embodiment of the present invention, in which engine on/off is controlled when the shifting possibility of the vehicle is defined as a second possibility, FIG. 6 is a view showing the method of controlling the engine on of the hybrid vehicle according to the exemplary embodiment of the present invention, in which engine on/off is controlled when the shifting possibility of the vehicle is defined as a first possibility, and FIG. 7 is a view showing a configuration of a system for controlling engine on of a hybrid vehicle according to an exemplary embodiment of the present invention.

Prior to describing the method of controlling the engine on of the hybrid vehicle according to the exemplary embodiment of the present invention, the system for controlling the engine on of the hybrid vehicle for performing the method will be described with reference to FIG. 7. Referring to FIG. 7, the system for controlling the engine on of the hybrid vehicle according to the exemplary embodiment of the present invention includes a transmission control unit (TCU) 100 and a hybrid control unit (HCU) 200, and the transmission control unit 100. The system is configured to efficiently perform on or off of the engine under cooperative control of the transmission control unit 100 and the hybrid control unit 200 on the basis of a shifting possibility.

In detail, the transmission control unit 100 includes a storage unit 110 for storing information related to a shift pattern of the vehicle which is determined between multiple regions on the basis of data collected by a data collector 300 which will be described later. The transmission control unit 100 derives the shifting possibility of the vehicle from each of the regions stored in the storage unit 110. Although not specifically shown in the drawings, the transmission control unit 100 may include a shift pattern determination unit of determining the shift pattern of the vehicle between the multiple regions on the basis of the data collected by the data collector 300 which will be described later, a shifting possibility deriving unit of deriving the shifting possibility of the vehicle from each of the regions, and a gear-shifting performing unit of performing gear shifting.

Furthermore, the hybrid control unit 200 derives an engine-on strategy of the vehicle on the basis of the shifting possibility derived by the transmission control unit 100 and controls an engine of the vehicle to be on or off in accordance with the derived engine-on strategy. Herein, the hybrid control unit 200 receives information related to the shifting possibility derived from the transmission control unit 100 through a vehicle network such as a can communication network or the like.

The system for controlling the engine on of the hybrid vehicle according to the exemplary embodiment of the present invention may further include a data collection unit 300 for collecting at least one piece of data among an accelerator pedal stroke, a variation of the accelerator pedal stroke, a vehicle speed, and a variation of the vehicle speed. According to an exemplary embodiment of the present invention, the data collection unit 300 may include an accelerator pedal sensor (APS) for detecting the accelerator pedal stroke, and a vehicle speed sensor for detecting the vehicle speed. The data collection unit 300 may derive the variation of the accelerator pedal stroke and the variation of the vehicle speed on the basis of the accelerator pedal stroke detected by the accelerator pedal sensor and the vehicle speed detected by the vehicle speed sensor.

The system for controlling the engine on of the hybrid vehicle according to the exemplary embodiment of the present invention may further include a display unit 400 for displaying that the on or off of the engine of the vehicle is performed on the basis of the shifting possibility under the cooperative control of the transmission control unit 100 and the hybrid control unit 200. In detail, the display unit 400 displays to a driver that the engine of the vehicle is on or off in accordance with the engine-on strategy derived from the hybrid control unit 200 on the basis of the shifting possibility derived from the transmission control unit 100. According to an exemplary embodiment of the present invention, the display unit 400 may be implemented as a cluster, a head-up display, an audio video navigation (AVN), or the like.

In detail, according to an exemplary embodiment of the present invention, the display unit 400 may display a time to reach a shift start point of the vehicle which is determined on the basis of a variation of a current accelerator pedal stroke and the determined shift pattern. That is, the display 400 may display an estimated shift time of the vehicle.

Furthermore, the display unit 400 displays that the engine is started at different times in accordance with a determined shifting possibility by comparing the determined time to reach the shift start point of the vehicle with a predetermined time. For example, when the shifting possibility is determined to be a first possibility in which gear shifting is highly likely to occur, the display unit 400 may display that engine-on time is retarded. When the shifting possibility is determined to be a second possibility in which gear shifting is less likely to occur, the display unit 400 may display that the engine is on previously.

Furthermore, the display unit 400 displays information such as the amount of energy savings or fuel efficiency improvement rate that results from performing on or off of the engine of the vehicle on the basis of the shifting possibility under the cooperative control of the transmission control unit 100 and the hybrid control unit 200. Herein, determinations of the amount of energy savings or fuel efficiency improvement rate is performed by the hybrid control unit 200.

Hereinafter, the method of controlling the engine on of the hybrid vehicle performed by the system for controlling the engine on of the hybrid vehicle according to the exemplary embodiment of the present invention described above will be described in detail with reference to FIG. 1, FIG. 2, FIG. 3, FIG. 4, FIG. 5 and FIG. 6.

In the method of controlling the engine on of the hybrid vehicle according to the exemplary embodiment of the present invention includes: determining a shift pattern of the vehicle between multiple regions (S100); deriving a shifting possibility of the vehicle from each of the regions (S200); and deriving an engine-on strategy of the vehicle on the basis of the derived shifting possibility, and controlling an engine of the vehicle to be on or off in accordance with the derived engine-on strategy (S300).

In detail, referring to FIG. 1, the determining the shift pattern of the vehicle between the multiple regions (S100) includes: determining whether the shift pattern of the vehicle is a first region (S110); determining whether the shift pattern of the vehicle is a second region (S120); and determining whether the shift pattern of the vehicle is a third region (S130).

More in detail, in determining the shift pattern of the vehicle between the multiple regions (S100), it is determined which region the shift pattern of the vehicle is on the basis of at least one of an accelerator pedal stroke, a variation of the accelerator pedal stroke, a vehicle speed, and a variation of the vehicle speed. According to an exemplary embodiment of the present invention, in determining the shift pattern of the vehicle between the multiple regions (S100), it may be determined which region the shift pattern of the vehicle is on the basis of at least one of a required torque, a virtual accelerator pedal stroke, a motor speed, a variation of the motor speed, a transmission input speed, a transmission output speed, and a transmission output acceleration. Hereinafter, for convenience of description, it will be described on the assumption that it is determined which region the shift pattern is on the basis of the variation of the accelerator pedal stroke, the vehicle speed, and the variation of the vehicle speed.

Referring to FIG. 3, in determining the shift pattern of the vehicle between the multiple regions, the regions may include a first region, a second region, and a third region.

Herein, the first region may be an initial startup region, and may be a region in which the acceleration pedal stroke (APS) increases during initial startup and acceleration increases therewith. Referring to FIG. 1, in determining whether the shift pattern of the vehicle is the first region (S110) in determining the shift pattern of the vehicle between the multiple regions (S100), when the variation of the accelerator pedal stroke is greater than a predetermined first variation and the vehicle speed is less than a predetermined value, the shift pattern of the vehicle is determined to be the first region. According to an exemplary embodiment of the present invention, the predetermined first variation may be 30 to 40%/s, and the predetermined vehicle speed value may be 20 kph.

Furthermore, the second region is a region in which a current acceleration is maintained. The second region may be a region in which a change in the accelerator pedal stroke is small after startup and the vehicle drives at a constant acceleration, and may be a region in which gear shifting is actively performed. Referring to FIG. 1, in determining whether the shift pattern of the vehicle is the second region (S120) in determining the shift pattern of the vehicle between the multiple regions (S100), when the variation of the accelerator pedal stroke is less than a predetermined second variation and the variation of the vehicle speed is greater than a predetermined first vehicle speed variation, the shift pattern of the vehicle is determined to be the second region. According to an exemplary embodiment of the present invention, the predetermined second variation may be 10%/s, and the predetermined first vehicle speed variation may be 15 m/s2.

Furthermore, the third region is a region in which the vehicle drives at a constant speed and the accelerator pedal stroke (APS) is reduced or maintained, and may be a region in which a change in the vehicle speed is small. Referring to FIG. 1, in determining whether the shift pattern of the vehicle is the third region (S130) in determining the shift pattern of the vehicle between the multiple regions (S100), when the variation of the accelerator pedal stroke is less than a predetermined third variation and an absolute value of the variation of the vehicle speed is less than a predetermined second vehicle speed variation, the shift pattern of the vehicle is determined to be the third region. According to an exemplary embodiment of the present invention, the predetermined third variation may be 5%/s, and the predetermined second vehicle speed variation may be 3 to 5 m/s2.

Meanwhile, deriving the shifting possibility of the vehicle from each of the regions (S200) includes: determining whether the shifting possibility of the vehicle in the first region is a first possibility, a second possibility, or a third possibility (S210); determining whether the shifting possibility of the vehicle in the second region is the first possibility, the second possibility, or the third possibility (s220); and determining whether the shifting possibility of the vehicle in the third region is the first possibility, the second possibility, or the third possibility (S230). Herein, the scale of each of the first to third possibilities may be predetermined. According to an exemplary embodiment of the present invention, the scale of the first possibility, the second possibility, and the third possibility may fulfill the following equation. Furthermore, in the present detailed description, the shifting possibility of the vehicle in each of the first region, the second region, and the third region is determined to be either of three possibilities (first, second, and third possibilities), but this is only an exemplary embodiment of the present invention. According to another exemplary embodiment of the present invention, the shifting possibility of the vehicle in each of the first region, the second region, and the third region may be determined to be either of multiple possibilities other than the three.

$$A > B > C \quad \text{[Equation 1]}$$

A: scale of the first possibility, B: scale of the second possibility, C: scale of the third possibility More in detail, the first possibility refers to a case where the shifting possibility is high. According to an exemplary embodiment of the present invention, a case where the shifting possibility is equal to or greater than 85% may be determined to be the first possibility. Furthermore, the second possibility refers to a case where the shifting possibility is high but there is a time allowance until gear shifting starts. According to an exemplary embodiment of the present invention, a case where the shifting possibility is equal to or greater than 70% may be determined to be the second possibility. Moreover, the third possibility refers to a case where the shifting is not immediately performed. According to an exemplary embodiment of the present invention, a case where the shifting possibility is equal to or greater than 55% may be determined to be the third possibility. Herein, specific numerical values provided as criteria for determining whether the shifting possibility is the first possibility, the second possibility, or the third possibility are values that are set through a test, and according to an exemplary embodiment of the present invention may be set through learning. In other words, through a test or learning, a probability numerical value may be derived by making data from when gear shifting is performed after a predetermined time period in each of the first region, the second region, and the third region.

In detail, determining whether the shifting possibility of the vehicle is the first possibility, the second possibility, or the third possibility in the first region in which the variation of the accelerator pedal stroke is greater than the first predetermined variation and the vehicle speed is less than the predetermined value (S210) includes: determining a time to reach a shift start point of the vehicle on the basis of a variation of a current accelerator pedal stroke and the determined shift pattern (S211); and comparing the determined time with a predetermined first time i and a predetermined second time ii, and determining whether the shifting possibility of the vehicle is the first possibility, the second possibility, or the third possibility (S212).

More in detail, in determining the time to reach the shift start point of the vehicle on the basis of the variation of a current accelerator pedal stroke and the determined shift pattern (S211), assuming that the variation of the current accelerator pedal stroke of the vehicle is maintained, the time to reach the shift start point in a corresponding shift pattern of the current vehicle is determined.

Furthermore, in comparing the determined time with the predetermined first time i and the predetermined second time ii, and determining whether the shifting possibility of the vehicle is the first possibility, the second possibility, or the third possibility (S212), when the determined time is less than the first time i, the shifting possibility is determined to be the first possibility, when the determined time is greater than the first time i and less than the second time ii, the shifting possibility is determined to be the second possibility, and when the determined time is greater than the second time ii, the shifting possibility is determined to be the third possibility.

Furthermore, determining whether the shifting possibility of the vehicle is the first possibility, the second possibility, or the third possibility in the second region in which the variation of the accelerator pedal stroke is less than the predetermined second variation and the vehicle speed is greater than the predetermined first vehicle speed variation (S220) includes: determining a time to reach a shift start point of the vehicle on the basis of a current accelerator pedal stroke and the determined shift pattern (S221); and comparing the determined time with a predetermined third time iii and a predetermined fourth time iv, and determining whether the shifting possibility of the vehicle is the first possibility, the second possibility, or the third possibility (S222).

More in detail, in determining the time to reach the shift start point of the vehicle on the basis of the variation of a current accelerator pedal stroke and the determined shift pattern of the vehicle (S221), assuming that the variation of the current accelerator pedal stroke of the vehicle is maintained, the time to reach the shift start point in a corresponding shift pattern of the current vehicle is determined.

Furthermore, in comparing the determined time with the predetermined third time iii and the predetermined fourth time iv, and determining whether the shifting possibility of the vehicle is the first possibility, the second possibility, or the third possibility (S222), when the determined time is less than the third time iii, the shifting possibility is determined to be the first possibility, when the determined time is greater than the third time iii and less than the fourth time iv, the shifting possibility is determined to be the second possibility, and when the determined time is greater than the fourth time iv, the shifting possibility is determined to be the third possibility.

Furthermore, determining whether the shifting possibility of the vehicle is the first possibility, the second possibility, or the third possibility in the third region in which the variation of the accelerator pedal stroke is less than the predetermined third variation and the absolute value of the vehicle speed is less than the predetermined second vehicle speed variation (S230) includes: determining a time to reach a shift start point of the vehicle on the basis of a current accelerator pedal stroke and the determined shift pattern (S231); and comparing the determined time with a predetermined fifth time v and a predetermined sixth time vi, and determining whether the shifting possibility of the vehicle is the first possibility, the second possibility, or the third possibility (S232).

More in detail, in determining the time to reach the shift start point of the vehicle on the basis of the current accelerator pedal stroke and the determined shift pattern (S231), assuming that the variation of the current accelerator pedal stroke of the vehicle is maintained, the time to reach the shift start point in a corresponding shift pattern of the current vehicle is determined.

Furthermore, in comparing the determined time with the predetermined fifth time v and the predetermined sixth time vi, and determining whether the shifting possibility of the vehicle is the first possibility, the second possibility, or the third possibility (S232), when the determined time is less than the fifth time v, the shifting possibility is determined to be the first possibility, when the determined time is greater than the fifth time v and less than the sixth time vi, the shifting possibility is determined to be the second possibility, and when the determined time is greater than the sixth time vi, the shifting possibility is determined to be the third possibility.

Hereinafter, when the shifting possibility is derived from each of the regions in accordance with the above-described method, control of engine on/off is performed in accordance with the respective shifting possibilities will be described in detail with reference to FIG. 4, FIG. 5, and FIG. 6.

In deriving the engine-on strategy of the vehicle on the basis of the derived shifting possibility, and controlling the engine of the vehicle to be on or off in accordance with the derived engine-on strategy (S300), when the shifting possibility of the vehicle is determined to be the third possibility, as shown in FIG. 4, the engine of the vehicle is on when a driver's required torque is greater than a predetermined first torque and the time at which the driver's required torque is greater than the first torque is maintained for a first constant time $\alpha$, and the engine is off when the driver's required torque is equal to or less than a predetermined second torque. Herein, the reason for allowing the engine of the vehicle to be on when the time at which the driver's required torque is greater than the first torque is maintained for the first constant time $\alpha$ is that when the engine is on immediately after the time at which the driver's required torque is greater than the first torque, on/off of the engine may be repeatedly performed, thus deteriorating the fuel efficiency. In an exemplary embodiment of the present invention, to prevent such a problem, the engine is on when the time at which the driver's required torque is greater than the first torque is maintained for the first constant time $\alpha$. This ensures that on/off of the engine is prevented from being unnecessarily repeatedly performed, thus preventing the fuel efficiency from being deteriorated.

Furthermore, in deriving the engine-on strategy of the vehicle on the basis of the derived shifting possibility, and controlling the engine of the vehicle to be on or off in accordance with the derived engine-on strategy (S300), when the shifting possibility of the vehicle is determined to be the second possibility, as shown in FIG. 5, the engine of the vehicle is immediately on when the driver's required torque is equal to or greater than a predetermined third torque, and the engine is off when the driver's required torque is equal to or less than a predetermined fourth torque. When the shifting possibility of the vehicle is determined to be the second possibility, the third torque, which is a reference torque for turning on the engine of the vehicle, is revised downward to turn on the engine previously, and also the fourth torque, which is a reference torque for turning off the engine of the vehicle, is revised downward to minimize repeated on/off of the engine.

Furthermore, in deriving the engine-on strategy of the vehicle on the basis of the derived shifting possibility, and controlling the engine of the vehicle to be on or off in accordance with the derived engine-on strategy (S300), when the shifting possibility of the vehicle is determined to be the first possibility, as shown in FIG. 6, the engine of the vehicle is on when the driver's required torque is greater than a predetermined fifth torque and the time at which the driver's required torque is greater than the fifth torque is maintained for a second constant time $\beta$, and the engine is off when the driver's required torque is equal to or less than a predetermined sixth torque. When the shifting possibility of the vehicle is determined to be the first possibility, the fifth torque, which is a reference torque for turning on the engine of the vehicle, is revised upward such that the on of the engine is retarded.

Meanwhile, the second constant time $\beta$ is longer than the first constant time $\alpha$. Furthermore, in terms of magnitude of the first torque, the second torque, the third torque, the fourth torque, the fifth torque, and the sixth torque, the magnitude of each of the torques may be predetermined. According to an exemplary embodiment of the present invention, the predetermined first torque, second torque, third torque, fourth torque, fifth torque, and sixth torque may fulfill the following equation. However, this is only an exemplary embodiment of the present invention, and the magnitude of each of the torques may vary depending on the setting.

$$\text{Fifth torque magnitude} > \text{first torque magnitude} > \text{third torque magnitude} > \text{sixth torque magnitude} > \text{second torque magnitude} > \text{fourth torque magnitude} \quad \text{[Equation 2]}$$

According to an exemplary embodiment of the present invention, the magnitude of reference torque values (first torque, third torque, and fifth torque) for turning on the engine is controlled differently in accordance with the shifting possibility determined in each of the regions. Through this, an engine on/off strategy is differently established in accordance with the shifting possibility, thus ensuring that the overall fuel efficiency of the vehicle is improved.

More in detail, according to an exemplary embodiment of the present invention, when the shifting possibility is determined to be the third possibility which is the lowest shifting possibility, the engine may be on in the same manner as the engine is typically on. When the shifting possibility is determined to be the first possibility which is the highest shifting possibility, the on of the engine is required to be retarded as much as possible. To the present end, the fifth torque, which is a comparison value of the driver's required torque for turning on the engine, is revised upwards. Also, even when the driver's required torque is equal to or greater than the fifth torque, the engine is on when the time at which the driver's required torque is greater than the fifth time is maintained for the second constant time $\beta$. These operations ensure that engine-on time is retarded. Furthermore, when the shifting possibility is determined to be the second possibility, the engine is required to be on previously. To the present end, the third torque is revised downward, and also the fourth torque, which is a reference value for turning off the engine, is revised downward to minimize repeated on/off of the engine.

Meanwhile, the method of controlling the engine on of the hybrid vehicle according to the exemplary embodiment of the present invention may further include displaying that the on or off of the engine is controlled in accordance with the derived engine-on strategy. In detail, in displaying that the on or off of the engine is controlled in accordance with the derived engine-on strategy, it is displayed whether the engine of the vehicle is on previously, or the on of the engine is retarded in accordance with the derived shifting possibility.

Meanwhile, the transmission control unit and the hybrid control unit according to an exemplary embodiment of the present invention may be implemented through a nonvolatile memory configured to store an algorithm configured to control operations of various components of a vehicle or data relating to software instructions that runs the algorithm, and through a processor configured to perform the previously described operations using the data stored in the memory. Herein, the memory and the processor may be implemented as individual chips. Alternatively, the memory and the processor may be implemented as a single chip on which the memory and the processor are integrated. The processor may be implemented in a form of one or more processors.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling engine on of a hybrid vehicle, the method comprising:
    determining, by a controller, a shift pattern of the hybrid vehicle between a plurality of regions;
    determining, by the controller, a shifting possibility of the hybrid vehicle from each of the plurality of regions; and
    determining, by the controller, an engine-on strategy of the hybrid vehicle on a basis of the determined shifting possibility, and controlling an engine of the hybrid vehicle to be on or off in accordance with the determined engine-on strategy,
    wherein in the determining the shift pattern of the hybrid vehicle between the plurality of regions, determining which region the shaft pattern is, on a basis of a variation of an accelerator pedal stroke, a vehicle speed and a variation of the vehicle speed.

2. The method of claim 1, wherein in the determining the shift pattern of the hybrid vehicle between the plurality of regions,
    determining which the region the shift pattern is on a basis of at least one of an accelerator pedal stroke.

3. The method of claim 2, wherein in the determining the shift pattern of the hybrid vehicle between the plurality of regions,
    the plurality of regions include a first region, a second region, and a third region.

4. The method of claim 3, wherein in the determining the shift pattern of the hybrid vehicle between the plurality of regions,
    when the variation of the accelerator pedal stroke is greater than a predetermined first variation and the vehicle speed is less than a predetermined value, the shift pattern of the hybrid vehicle is determined to be the first region,
    when the variation of the accelerator pedal stroke is less than a predetermined second variation and the variation of the vehicle speed is greater than a predetermined first vehicle speed variation, the shift pattern of the hybrid vehicle is determined to be the second region, and
    when the variation of the accelerator pedal stroke is less than a predetermined third variation and an absolute value of the variation of the vehicle speed is less than a predetermined second vehicle speed variation, the shift pattern of the hybrid vehicle is determined to be the third region.

5. The method of claim 3, wherein the determining the shifting possibility of the hybrid vehicle from each of the plurality of regions includes:
    determining whether the shifting possibility of the hybrid vehicle in the first region is a first possibility, a second possibility, or a third possibility;
    determining whether the shifting possibility of the hybrid vehicle in the second region is the first possibility, the second possibility, or the third possibility; and
    determining whether the shifting possibility of the hybrid vehicle in the third region is the first possibility, the second possibility, or the third possibility,
    wherein a scale of each of the first, second, and third possibilities is predetermined.

6. The method of claim 5, wherein the determining whether the shifting possibility of the hybrid vehicle is the first possibility, the second possibility, or the third possibility in the first region in which the variation of the accelerator pedal stroke is greater than a first predetermined variation and the vehicle speed is less than a predetermined value includes:
    determining a time to reach a shift start point of the hybrid vehicle on a basis of a variation of a current accelerator pedal stroke and the determined shift pattern; and
    comparing the determined time with a predetermined first time and a predetermined second time, and determining that the shifting possibility is the first possibility when the determined time is less than the predetermined first time, that the shifting possibility is the second possibility when the determined time is greater than the predetermined first time and less than the predetermined second time, and that the shifting possibility is the third possibility when the determined time is greater than the predetermined second time.

7. The method of claim 5, wherein the determining whether the shifting possibility of the hybrid vehicle is the first possibility, the second possibility, or the third possibility in the second region in which the variation of the accelerator pedal stroke is less than a predetermined second variation and the vehicle speed is greater than a predetermined first vehicle speed variation includes:
    determining a time to reach a shift start point of the hybrid vehicle on a basis of a current accelerator pedal stroke and the determined shift pattern; and
    comparing the determined time with a predetermined third time and a predetermined fourth time, and determining that the shifting possibility is the first possibility when the determined time is less than the predetermined third time, that the shifting possibility is the second possibility when the determined time is greater than the predetermined third time and less than the predetermined fourth time, and that the shifting possibility is the third possibility when the determined time is greater than the predetermined fourth time.

8. The method of claim 5, wherein the determining whether the shifting possibility of the hybrid vehicle is the first possibility, the second possibility, or the third possibility in the third region in which the variation of the accelerator pedal stroke is less than a predetermined third variation and an absolute value of the vehicle speed is less than a predetermined second vehicle speed variation includes:
    determining a time to reach a shift start point of the hybrid vehicle on a basis of a variation of a current accelerator pedal stroke and the determined shift pattern; and
    comparing the determined time with a predetermined fifth time and a predetermined sixth time, and determining that the shifting possibility is the first possibility when the determined time is less than the predetermined fifth time, that the shifting possibility is the second possibility when the determined time is greater than the predetermined fifth time and less than the predetermined sixth time, and that the shifting possibility is the third possibility when the determined time is greater than the predetermined sixth time.

9. The method of claim 5, wherein in the determining the engine-on strategy of the hybrid vehicle on a basis of the determined shifting possibility, and controlling the engine of the hybrid vehicle to be on or off in accordance with the determined engine-on strategy,
    when the shifting possibility of the hybrid vehicle is determined to be the third possibility, the engine of the hybrid vehicle is on when a driver's required torque is greater than a predetermined first torque and a time at which the driver's required torque is greater than the predetermined first torque is maintained for a first constant time, and the engine is off when the driver's required torque is equal to or less than a predetermined second torque.

10. The method of claim 9, wherein in the determining the engine-on strategy of the hybrid vehicle on a basis of the determined shifting possibility, and controlling the engine of the hybrid vehicle to be on or off in accordance with the determined engine-on strategy,
    when the shifting possibility of the hybrid vehicle is determined to be the second possibility, the engine of the hybrid vehicle is on when the driver's required torque is equal to or greater than a predetermined third torque, and the engine is off when the driver's required torque is equal to or less than a predetermined fourth torque.

11. The method of claim 10, wherein in the determining the engine-on strategy of the hybrid vehicle on a basis of the determined shifting possibility, and controlling the engine of the hybrid vehicle to be on or off in accordance with the determined engine-on strategy,
    when the shifting possibility of the hybrid vehicle is determined to be the first possibility, the engine of the hybrid vehicle is on when the driver's required torque is greater than a predetermined fifth torque and a time at which the driver's required torque is greater than the predetermined fifth torque is maintained for a second constant time, and the engine is off when the driver's required torque is equal to or less than a predetermined sixth torque.

12. The method of claim 11, wherein the second constant time is longer than the first constant time.

13. The method of claim 11, wherein in the predetermined first torque, the predetermined second torque, the predetermined third torque, the predetermined fourth torque, the predetermined fifth torque, and the predetermined sixth torque, a magnitude of each of the first to sixth torques is predetermined.

14. The method of claim 1, further including:
    after the determining the engine-on strategy of the hybrid vehicle on a basis of the determined shifting possibility, and controlling the engine of the hybrid vehicle to be on or off in accordance with the determined engine-on strategy,
    displaying that the on or off of the engine is controlled in accordance with the determined engine-on strategy.

15. The method of claim 14, wherein in the displaying that the on or off of the engine is controlled in accordance with the determined engine-on strategy,
    displaying whether the engine of the hybrid vehicle is on previously, or the on of the engine is retarded in accordance with the determined shifting possibility.

16. A system of controlling engine on of a hybrid vehicle, the system comprising:
    a transmission control unit (TCU) including a storage unit storing information related to a shift pattern of the hybrid vehicle which is determined between a plurality of regions, and determining a shifting possibility of the hybrid vehicle from each of the plurality of regions stored in the storage unit; and
    a hybrid control unit (HCU) determining an engine-on strategy of the hybrid vehicle on a basis of the shifting possibility determined by the TCU, and controlling an engine of the hybrid vehicle to be on or off in accordance with the determined engine-on strategy,
    wherein in the determining the shift pattern of the hybrid vehicle between the plurality of regions, determining which region the shaft pattern is, based on a variation of an accelerator pedal stroke, a vehicle speed and a variation of the vehicle speed.

17. The system of claim 16, further including:
    data collection unit connected to the TCU and collecting at least one piece of data among the accelerator pedal stroke, the variation of the accelerator pedal stroke, the vehicle speed, and the variation of the vehicle speed.

18. The system of claim 16, further including:
    a display unit displaying that the on or off of the engine of the hybrid vehicle is performed on a basis of the shifting possibility under cooperative control of the TCU and the HCU.

* * * * *